W. S. BRICKELL.
WHEEL.
APPLICATION FILED DEC. 21, 1920.

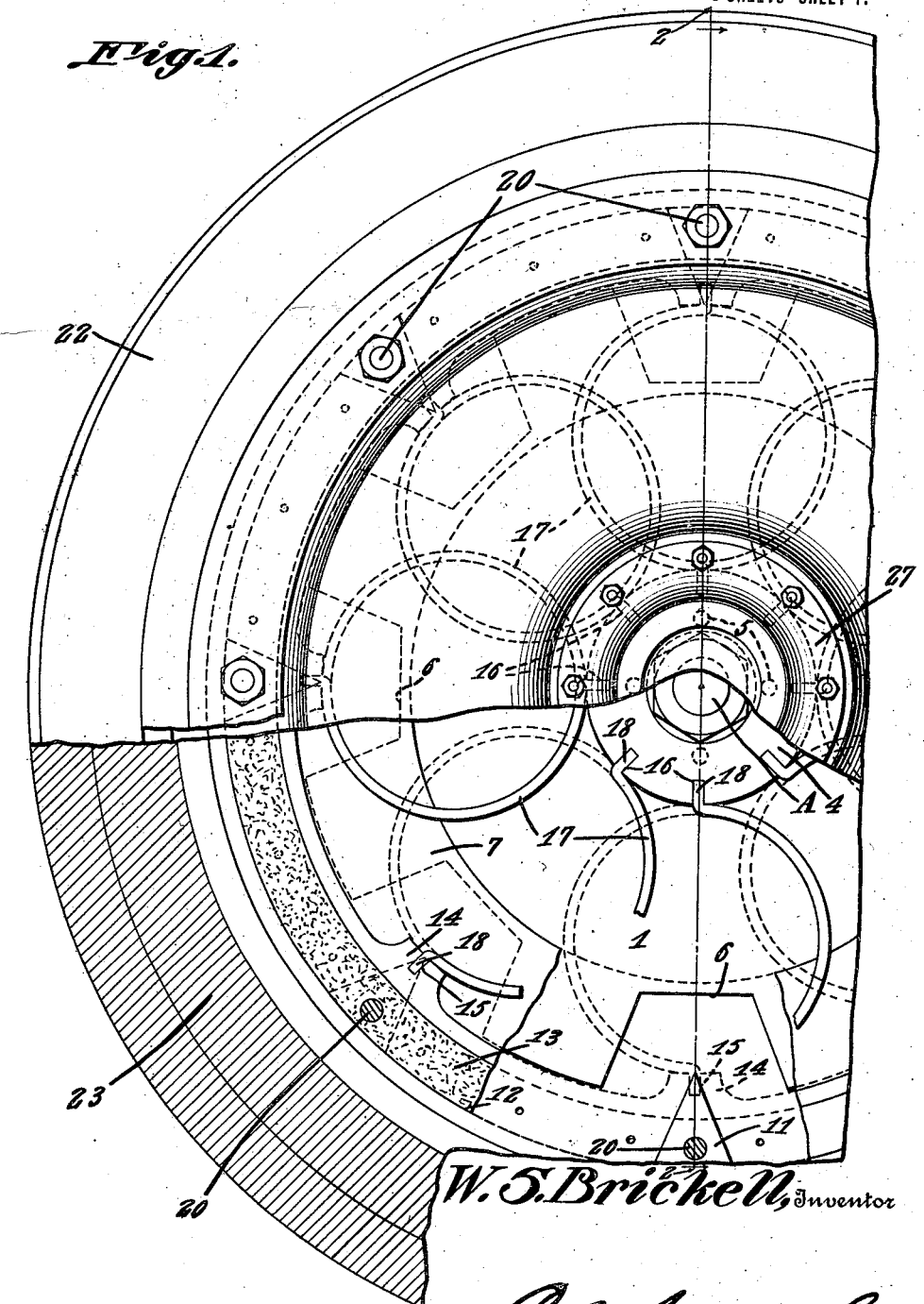

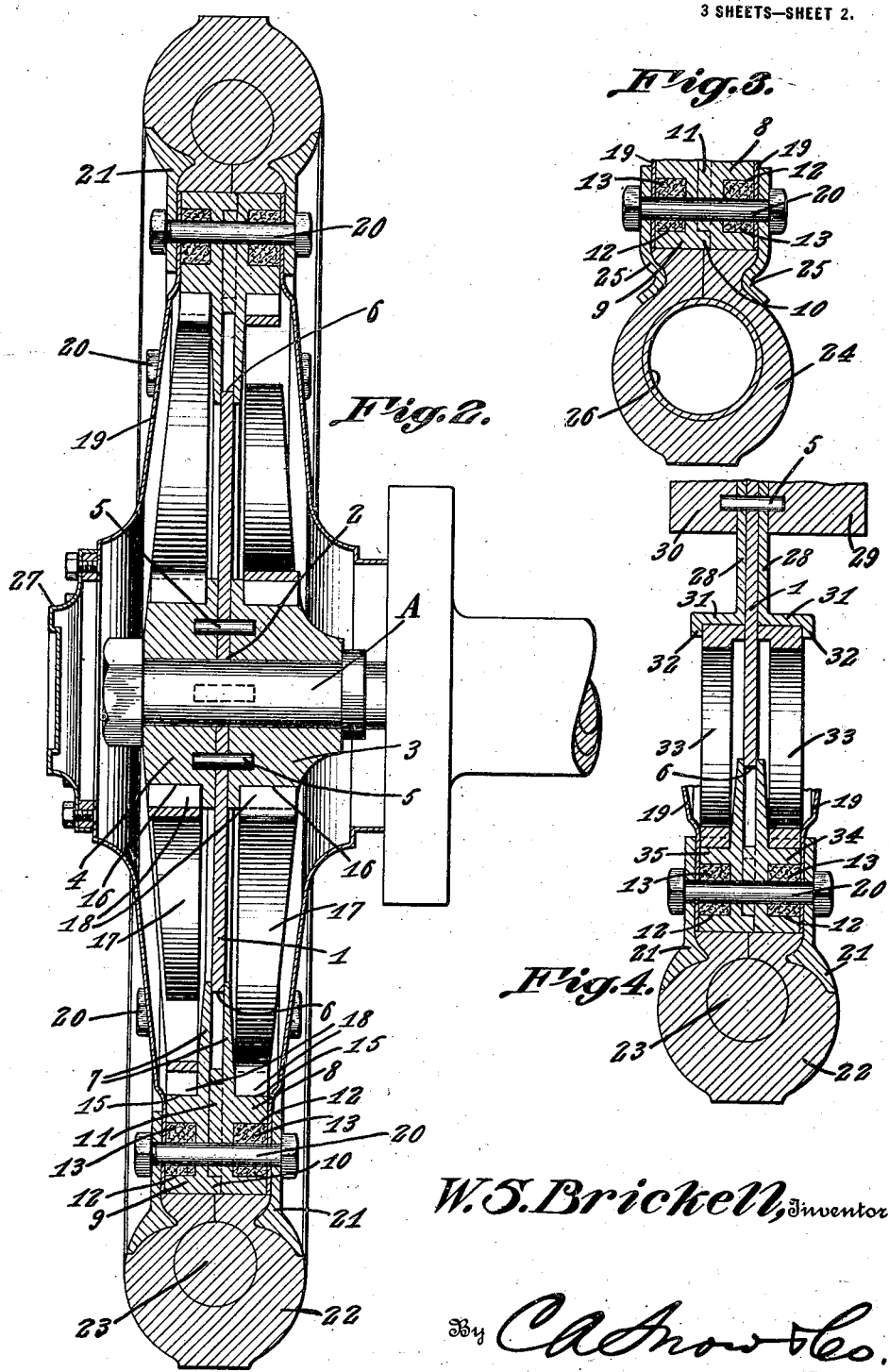

1,426,254.

Patented Aug. 15, 1922.
3 SHEETS—SHEET 3.

W. S. Brickell, Inventor

By C. A. Snow & Co.
Attorneys

UNITED STATES PATENT OFFICE.

WILLIAM S. BRICKELL, OF BUFFALO, NEW YORK.

WHEEL.

1,426,254.  Specification of Letters Patent.  Patented Aug. 15, 1922.

Application filed December 21, 1920. Serial No. 432,248.

*To all whom it may concern:*

Be it known that I, WILLIAM S. BRICKELL, a citizen of the United States, residing at Buffalo, in the county of Erie and State of New York, have invented a new and useful Wheel, of which the following is a specification.

This invention relates to a spring wheel, one of its objects being to provide a device of this character the mechanism of which is completely covered and protected under all conditions and which provides sufficient resiliency to permit use of the wheel as a substitute for a wheel equipped with pneumatic tires.

A still further object is to so construct the wheel as to relieve the spring from all lateral stresses without, however, interfering with the resiliency of the wheel.

A still further object is to provide a wheel of this character which is attractive in appearance and the parts of which will not become displaced or loose.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred forms of the invention have been shown.

In said drawings

Figure 1 is a view partly in side elevation and partly in section of a portion of a wheel constructed in accordance with the present invention.

Figure 2 is a section on line 2—2, Figure 1.

Figure 3 is a section through a rim modified for engagement with a pneumatic tire.

Figure 4 is a section through a portion of a modified form of wheel.

Figure 5:
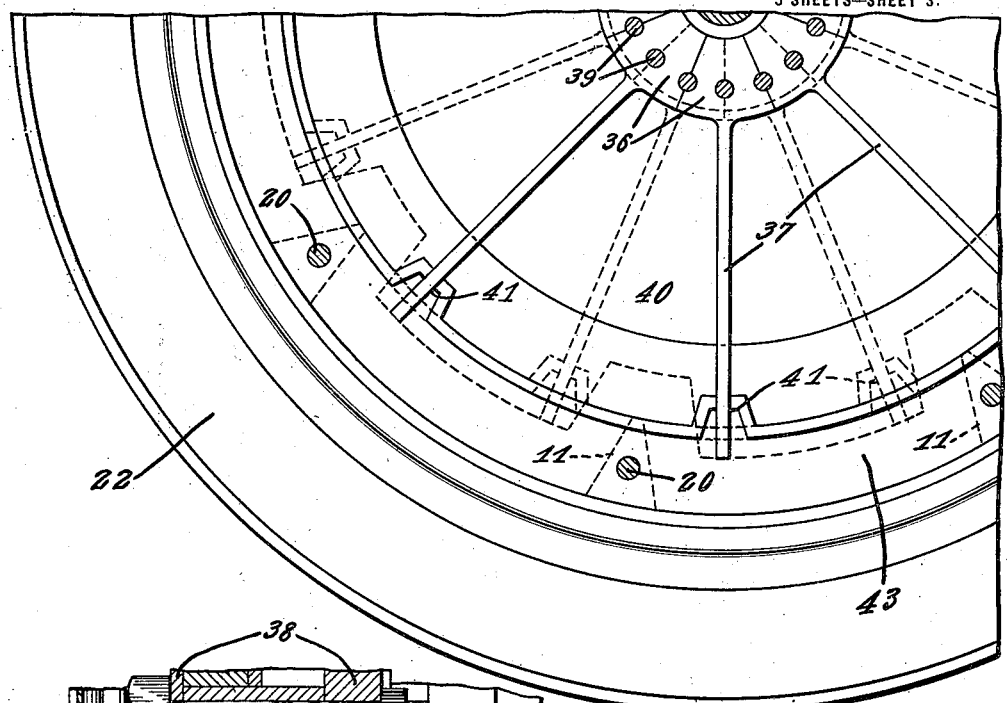
Figure 5 is a view partly in side elevation and partly in section of another modified form of wheel.

Referring to the figures by characters of reference 1 designates a disk having a central opening 2 through which the axle spindle A may extend and arranged at opposite sides of this disk at the center thereof are hub sections 3 and 4 preferably held to each other and to the disk by dowels 5 or the like, it being understood that the hub sections 3 and 4 are also mounted on the spindle A. The disk 1 is provided in its periphery with recesses 6 regularly spaced and this recessed peripheral portion of the disk is slidably seated between inwardly extending parallel flanges 7 provided at the inner sides of rings 8 and 9 respectively. One of the rings has an annular rib 10 upon its inner side at the periphery thereof constituting a spacing element for engaging the opposed ring 8 and mounted on the ring 8 are guide projections 11 preferably V-shaped as shown particularly in Figure 1. These projecting portions 11 lie in the same plane with the disk 1 and project into the peripheral recesses in the disk. Thus the annular movement of the rings 8 and 9 relative to the disk 1 is limited by the portions 11 projecting into the recesses 6. The portions 11, however, will not interfere with the radial movement of the rings relative to the disk.

Formed in the outer side faces of the rings 8 and 9 are annular grooves 12 for holding suitable packing material indicated at 13 and provided on the inner arcuate faces of the rings 8 and 9 are ears 14 provided with transverse notches 15. Similar notches 16 are also provided within the peripheral portions of the hub sections 3 and 4, the recesses 16 being equal in number to the recesses 15. Interposed between the hub section 3 and the ring 8 is an annular series of semicircular springs 17 the ends of which are extended at angles to provide ears 18 which are seated within the notches 15 and 16 respectively. Another series of similar springs 17 is interposed between the hub section 4 and the ring 9 but these latter springs are disposed oppositely to the first mentioned springs 17 as indicated by dotted lines in Figure 1. It will be noted that the springs are gradually reduced in width from their inner to their outer ends, as shown in Figure 2.

It will be obvious from the foregoing that by arranging the springs in the manner described they will hold the rings 8 and 9 normally concentric with the hub sections 3 and 4 but when the wheel is subjected to a load or is traveling over a rough surface, relative movement of the rings 8 and 9 and the hub sections 3 and 4 is permitted, this movement being resisted by the sprangs which serve to absorb all jars. The disk 1 by reciprocating between the flanges 7 relieves the springs of all lateral strain.

Housing disks, which can be suitably shaped, and which have been indicated at 19, are mounted at their peripheries on the outer faces of the rings 8 and 9 and can be held thereto by bolts 20 or the like. These bolts can also be used for fastening clincher rings 21 to the outer faces of the housing disks 19. The clincher rings engage a suitably constructed tire. For example and as shown in Figure 2, this tire can be a cushion tire indicated at 22 and provided with a suitable core 23 of rubber or the like. Or, if preferred, the tire can be of the pneumatic type, the casing 24, shown in Figure 3, being engaged by the clincher rings 25 while an inner tube 26 is removably mounted within the casing. The housing disks 19 are so shaped as to completely protect the springs and other working parts of the wheel and the outer housing disk 19 can be provided with a removable hub cap 27 while the inner housing disk 19 can be so shaped as to prevent the admission of dust between the axle housing and the wheel.

Instead of having the springs mounted and shaped as shown in Figures 1 and 2 they can be constructed as illustrated in Figure 4. In this form of wheel there are provided disks 28 secured to the hub portions 29 and 30 and having peripheral flanges 31 extending laterally therefrom and provided with guide ribs 32 forming seats for the inner ends of springs 33 which are smaller than those shown in Figure 2 and the outer ends of which are mounted in the rings 34 and 35 in the same manner as in the structure shown in Figure 2.

Figure 6:
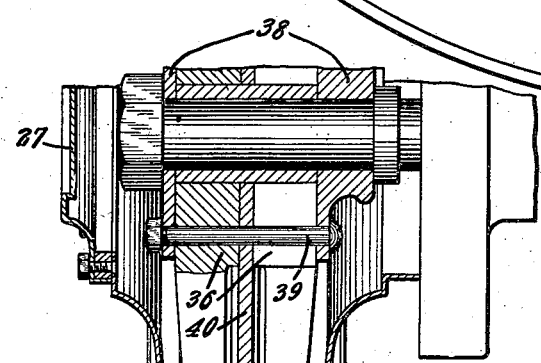
Figure 6 is a section through the structure shown in Figure 5.

If desired instead of utilizing arcuate springs the wheel can be made as illustrated in Figures 5 and 6. In this form of device the hub includes annular series of blocks 36, each block having a resilient straight arm 37 extending radially therefrom, the arms of one series being oppositely spaced between the arms of the other series. The blocks 36 are interposed between rings 38, all of the parts being held together by bolts 39 extending through the rings and blocks. A disk 40 is arranged between the series of blocks and is mounted at its periphery in the same manner as heretofore described. The resilient arms 37 extend straight into notches or recesses 41 formed in the rings 42 and 43. Obviously with this arrangement those arms which are in vertical positions can move upwardly and downwardly within their recesses during relative movement of the rim and hub portions of the wheel while the remaining arms will be free to flex transversely and thus yieldingly retard this up and down movement. The resilient action obtained, however, will be just as efficient as that obtained in the structures hereinbefore described.

It is to be understood that if preferred the resilient arms 37 can be laminated so as to properly support the load to be sustained. Furthermore the disk 40 may be omitted as the arms 37 will ordinarily absorb all lateral stresses.

What is claimed is:—

1. A wheel including hub sections, a disk therebetween, dowels extending through the disk and into the hub sections, rings forming the rim of the wheel, an annular rib upon one of the rings and engaging the other ring to hold the rings spaced apart, angular guide projections upon the other ring and interposed between both rings, flanges extending inwardly from the inner portions of the rings and spaced apart by the guides, said flanges constituting means for receiving the marginal portion of the disk, and annular series of springs interposed between each ring and one of the hub portions, said disk and flanges being extended between the series of springs.

2. In a wheel the combination with hub sections and a disk therebetween and extending radially therebeyond, of parallel rings forming the rim of the wheel, an annular rib upon one of the rings for spacing the rings, angular projections upon the other ring and between the two rings, inwardly extending annular flanges upon the rings, said disk having marginal recesses for the reception of the angular projections, the flanges being mounted to slidably engage opposed faces of the disk, and means extending transversely through the rings for holding them assembled.

3. In a wheel the combination with hub sections, and a disk secured therebetween and extending radially therebeyond, said disk having regularly spaced peripheral recesses, of parallel rings constituting the rim of the wheel, a spacing rib upon one of the rings, angular projections upon the other ring, said rib and projections being interposed between the two rings, inwardly extending spaced annular flanges upon the rings and forming a guide for the disk, the peripheral recesses in the disk being adapted to receive the projections between the rings, housing disks mounted at their peripheries upon opposed sides of the rim formed by the rings, clincher rings mounted on the outer sides of the housing disks, and means extending transversely through the clincher rings, housing disk and rim rings for holding them assembled.

In testimony that I claim the foregoing as my own, I have hereto affixed my signature in the presence of two witnesses.

WILLIAM S. BRICKELL.

Witnesses:
JOHN N. SOUDERS,
MARION J. VAN AERNAM.